United States Patent Office 2,989,507
Patented June 20, 1961

2,989,507
CATALYTIC POLYMERIZATION PROCESS
Donald Edward Hudgin, Summit, and Frank Michael Berardinelli, South Orange, N.J., assignors to Celanese Corporation of America, New York, N.Y., a corporation of Delaware
No Drawing. Filed Oct. 21, 1957, Ser. No. 691,144
8 Claims. (Cl. 260—67)

This invention relates to polymeric materials and more particularly to a method for producing a tough, high molecular weight material by the polymerization of trioxane.

Trioxane is a cyclic trimer of formaldehyde having a six-membered heterocyclic ring consisting of alternating oxygen atoms and methylene groups. Pure trioxane melts at 64° C. and boils without decomposition at approximately 115° C.

It is known that trioxane may be polymerized in the presence of certain specific inorganic fluorides such as antimony trifluoride, to produce a tough, high molecular weight polymer, known as polyoxymethylene, after a polymerization period ranging from one to seven days. It has been reported that the nature of the inorganic fluoride is quite critical and that many metallic fluorides, such as sodium fluoride, calcium fluoride, lead fluoride and ferric fluoride show no catalytic activity.

It is an object of this invention to provide a new process for making a tough, high molecular weight material from trioxane in which conversion takes place in seconds or minutes, rather than days. Other objects will appear hereinafter.

The objects of this invention are accomplished by a process which comprises polymerizing trioxane in the presence of boron fluoride to produce polyoxymethylene.

Preferably, the polymerization takes place in molten trioxane at atmospheric pressure. However, the temperature of the reaction may vary from about −100° to about 180° C. and the trioxane may be in solid or vapor phase at the temperature extremes.

The boron fluoride should be introduced into the polymerization zone in amounts between about .001 and about 1.0 weight percent, based on the weight of trioxane in the polymerization zone. Preferably, amounts between about .003 and about 0.1 weight percent should be used.

The trioxane in the reaction zone is preferably anhydrous or substantially anhydrous. Small amounts of moisture, such as may be present in commercial grade trioxane or may be introduced by contact with atmospheric air are not harmful.

In one method of preparation, the trioxane is maintained as a molten body at a temperature between about 70 and 90° C. Boron fluoride vapors may be sparged into the molten body at a constant rate over a period of from about 1 to about 5 seconds.

Another advantageous procedure involves the polymerization of trioxane in a solution of about 10 to about 70 weight percent in a solvent, such as benzene or cyclohexane. Boron fluoride is added in the proportion stated above, based on the weight of trioxane in solution. The polymer comes out of solution as it is formed. Polymerization in solution is generally slower depending on concentration and temperature and may take as long as four hours. A complete description of this method of procedure may be found in our application Serial No. 691,145, filed concurrently herewith.

In still another advantageous procedure, the trioxane is suspended in amounts between about 25 and about 75 weight percent in an inert liquid such as normal decane which is at least partially a non-solvent therefor. Boron fluoride in the amount specified above is added and solid polymer is quickly formed in the suspended trioxane. A complete description of this method of procedure may be found in our application Serial No. 691,142, filed concurrently herewith.

The polymer, after formation, is washed clean of monomer, if any, catalyst and solvent or suspension medium if any. When there is no solvent or suspension medium one or more water washes will generally suffice. Where a solvent or suspension medium is used, the polymer is generally washed first with an organic solvent, such as ether, and then finally washed with water.

The washed polymer may be compression molded at 180° C. for two minutes, particularly after stabilization with five weight percent of diphenylamine to produce tough molded objects.

Example 1

150 parts by weight of commercial trioxane was heated to 90° C. in a vessel equipped with a condenser. About 0.1 part by weight of gaseous boron trifluoride was added over a period of 3 seconds. Polymerization was almost instantaneous.

The polymer was broken up into small particles and washed three times with hot water. The polymer was dried overnight at 60–65° C. at atmospheric pressure. The dried polymer had no odor of formaldehyde.

When stabilized with 5% by weight of diphenylamine a white, translucent disc was formed by compression at 180° C. for two minutes.

Example 2

One hundred and fifty parts of trioxane was dissolved in 290 parts of ethylene dichloride and the solution cooled to 10° C. Boron fluoride gas was allowed to flow in onto the surface of the stirred solution. Polymerization was practically instantaneous. The temperature rose to 42° C. in six minutes in spite of an external cooling bath. After cooling to 10° C. 130 parts of ethylene dichloride was added and the whole mixture refluxed a half hour to help break up the polymeric mass. After filtering the polymer was washed three times with 90–95° water and then dried overnight at 60° at atmospheric pressure. There was obtained 122 parts of polymer (82%).

The polymer produced in accordance with the process of this invention may be used in the same manner as other high molecular weight polyoxymethylenes and molded or extruded to produce useful articles.

It is to be understood that the foregoing detailed description is merely given by way of illustration and that many variations may be made therein without departing from the spirit of our invention.

Having described our invention, what we desire to secure by Letters Patent is:

1. A process for preparing tough, high molecular weight material which comprises polymerizing trioxane in condensed, undiluted state under substantially anhydrous conditions in contact with a small catalytic amount of molecular boron fluoride.

2. A process for preparing tough, high molecular weight material which comprises polymerizing trioxane in condensed, undiluted state under substantially anhydrous conditions for a period not greater than 4 hours in contact with a small catalytic amount of molecular boron fluoride.

3. A process for preparing tough, high molecular weight material which comprises polymerizing trioxane in condensed, undiluted state under substantially anhydrous conditions at a temperature between about −10 and about 180° C. in contact with a small catalytic amount of molecular boron fluoride.

4. A process for preparing tough, high molecular weight material which comprises polymerizing trioxane in condensed, undiluted state under substantially anhydrous conditions at a temperature between about −10 and about 180° C. for a period not greater than 4 hours in contact with from about .001 to about 1.0 weight percent of boron fluoride.

5. A process of preparing tough, high molecular weight material which comprises polymerizing molten trioxane under substantially anhydrous conditions in contact with a small catalytic amount of molecular boron fluoride.

6. A process for preparing tough, high molecular weight material which comprises supplying trioxane in condensed, undiluted state to a polymerization zone, supplying gaseous boron fluoride to said zone in an amount ranging from about .001 to about 1.0 weight percent, and polymerizing said trioxane in said zone at a temperature between about −10 and about 180° C. under substantially anhydrous conditions.

7. A process for preparing tough, high molecular weight material which comprises supplying trioxane in condensed, undiluted state to a polymerization zone, supplying a small catalytic amount of gaseous boron fluoride to said zone and polymerizing said trioxane in said zone at a temperature between about −10 and about 180° C. under substantially anhydrous conditions.

8. A process of preparing tough, high molecular weight material which comprises polymerizing solid trioxane under substantially anhydrous conditions in contact with a small catalytic amount of molecular boron fluoride.

References Cited in the file of this patent

UNITED STATES PATENTS

| | | |
|---|---|---|
| 2,270,135 | Mikeska et al. | Jan. 13, 1942 |
| 2,768,994 | MacDonald | Oct. 30, 1956 |
| 2,795,571 | Schneider | June 11, 1957 |

OTHER REFERENCES

Bevington et al.: Proc. Royal Soc., vol. A205 (1951), pp. 516–529.

Walker: "Formaldehyde," A.C.S. Monograph No. 120 (1953), chapter 7.